(12) United States Patent
Takanashi et al.

(10) Patent No.: US 6,193,020 B1
(45) Date of Patent: Feb. 27, 2001

(54) ABRASION DETECTING PROBE FOR A BRAKE PAD

(75) Inventors: Hitoshi Takanashi; Kazuhiro Asao, both of Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 09/192,182

(22) Filed: Nov. 16, 1998

(30) Foreign Application Priority Data

Nov. 17, 1997 (JP) .................................................. 9-315478
Dec. 26, 1997 (JP) .................................................. 9-359920

(51) Int. Cl.[7] ...................................................... F16D 66/00
(52) U.S. Cl. ......................................................... 188/1.11 L
(58) Field of Search ........................ 188/1.11 L, 1.11 W, 188/1.11 E, 1.11 R, 214; 340/454, 453

(56) References Cited

U.S. PATENT DOCUMENTS

| | | | |
|---|---|---|---|
| 4,016,533 | * 4/1977 | Ishikawa et al. | 340/454 |
| 4,391,350 | * 7/1983 | Moriya | 188/1.11 L |
| 5,347,858 | * 9/1994 | Ito et al. | 340/454 |
| 5,454,450 | * 10/1995 | Tanigawa | 188/1.11 L |
| 5,833,033 | * 11/1998 | Takanashi | 188/1.11 L |
| 5,839,545 | * 11/1998 | Preston et al. | 188/1.11 L |

FOREIGN PATENT DOCUMENTS

| | | |
|---|---|---|
| 658 699 | 6/1995 | (EP) . |
| 781 936 | 7/1997 | (EP) . |
| 80 27765 | 7/1982 | (FR) . |
| 6-300064 | 10/1994 | (JP) . |

* cited by examiner

*Primary Examiner*—Michael Mar
*Assistant Examiner*—Melanie Talavera
(74) *Attorney, Agent, or Firm*—Banner & Witcoff, Ltd.

(57) ABSTRACT

The invention provides an abrasion detecting probe for a brake pad which does not require insert-moulding and in which production costs are low.

A probe 20 is housed in base components 35 and 36, which are snap-fitted together. In this manner, the terminal 22 can be attached within the base member 21 in a precise predetermined position by the simple operation of joining the base components 35 and 36 together. Therefore, as opposed to a conventional probe, insert-moulding is not required and the probe can be manufactured simply and cheaply. A sleeve 50 may provide an audible brake wear warning.

12 Claims, 10 Drawing Sheets

ABRASION DETECTING PROBE FOR A BRAKE PAD

TECHNICAL FIELD

The present invention relates to an abrasion detecting probe for a brake pad, the probe having a metal terminal inside a synthetic resin base member.

BACKGROUND TO THE INVENTION

Conventional abrasion detecting probes of this kind include the one described in the JP 6-300064. This type of abrasion detecting probe 1, shown in FIG. 11 hereof, comprises a pair of electric wires D crimped to a metal terminal 2, this terminal 2 being insert-moulded inside a synthetic resin base member 3. The abrasion detecting probe 1 is fixed through a supporting backplate of a brake pad, and when the brake pad attains its abrasion limit as a result of sliding contact with a brake disc, a tip 4 of the probe 1 is worn away together with the brake pad, and the circuit between the two electric wires D is broken.

However, because the abrasion detecting probe 1 described above is produced by insert-moulding, position setting of the terminal 2 inside the mould is a troublesome and time-consuming operation which does not allow costs to be reduced. Accurate positioning is essential to ensure that the abrasion limit is set precisely.

The present invention has been developed after taking the above problem into consideration, and aims to present an abrasion detecting probe for a brake pad in which insert-moulding is not required and in which production costs can accordingly be reduced.

SUMMARY OF THE INVENTION

According to the invention there is provided a wear detecting probe for a vehicle brake lining having a backplate and a friction lining thereon, said probe comprising an electrically conducting member adapted for connection to an electrical circuit by input and output connections, said conducting member being housed inside an insulating body and having a bridging portion adjacent one end of said body such that, in use, a braking surface can wear away said bridging portion to separate said conducting member into two, and thereby break an electrical circuit, wherein said body comprises two or more mutually attachable components defining a cavity to house said conducting member.

Such a construction avoids the need for insert moulding, and thus lower manufacturing costs can be achieved.

The components are typically produced as precision plastic mouldings with a shape suitable for positioning and holding the conducting member with accuracy.

Preferably latch means are provided to hold the body components together to avoid rattling, and to avoid separation during transport. The latch means are preferably adapted to pass through the conducting member as an aid to correct location.

In a preferred embodiment the probe is surrounded by a protruding sleeve of noise generating material. Such a sleeve gives an audible warning of the approach of the pad abrasion limit. This arrangement permits the friction lining to be replaced before the conducting member is broken, and the probe itself to be inserted into the new friction lining; thus the electrical connections need not be disturbed.

BRIEF DESCRIPTION OF DRAWINGS

Other features of the invention will be apparent from the following description of two preferred embodiments shown by way of example only in the accompanying drawings in which.

DESCRIPTION OF PREFERRED EMBODIMENTS

A first embodiment is described with reference to FIGS. 1–7.

Figure 1:
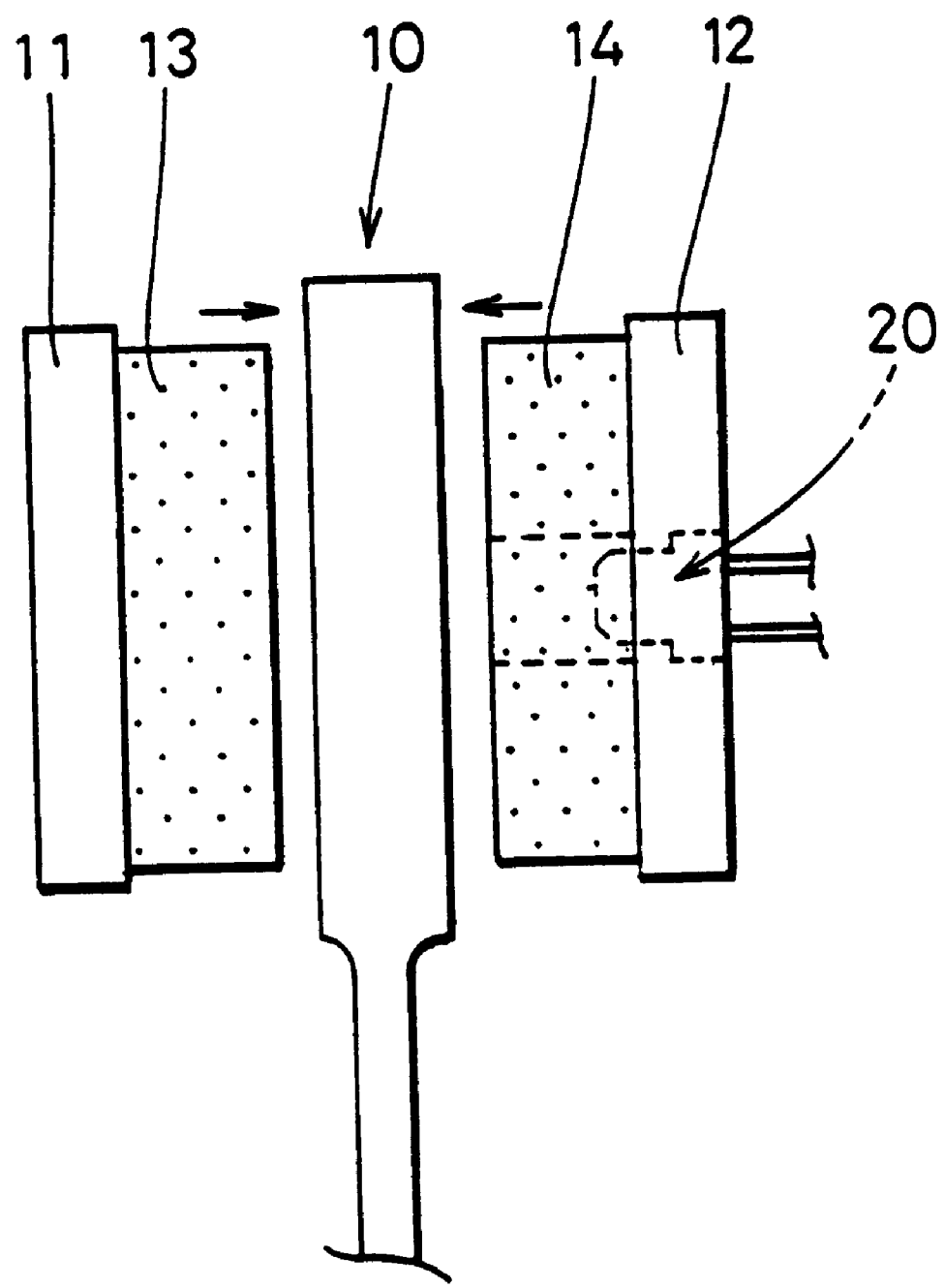
FIG. 1 is a side view showing a braking device of the present invention.

FIG. 1 shows the components of a braking device. The number 10 in FIG. 1 refers to a brake disc, a pair of backplates 11 and 12 being provided on both sides thereof, brake pads 13 and 14 being provided on the backplates 11 and 12 on the sides thereof facing the disc 10. The backplates 11 and 12 are moved towards the disc 10 by a mechanism (not shown), and as a result, the brake pads 13 and 14 press against the disc 10 and frictional force halts the rotation of the disc 10. This is conventional.

Figure 2:
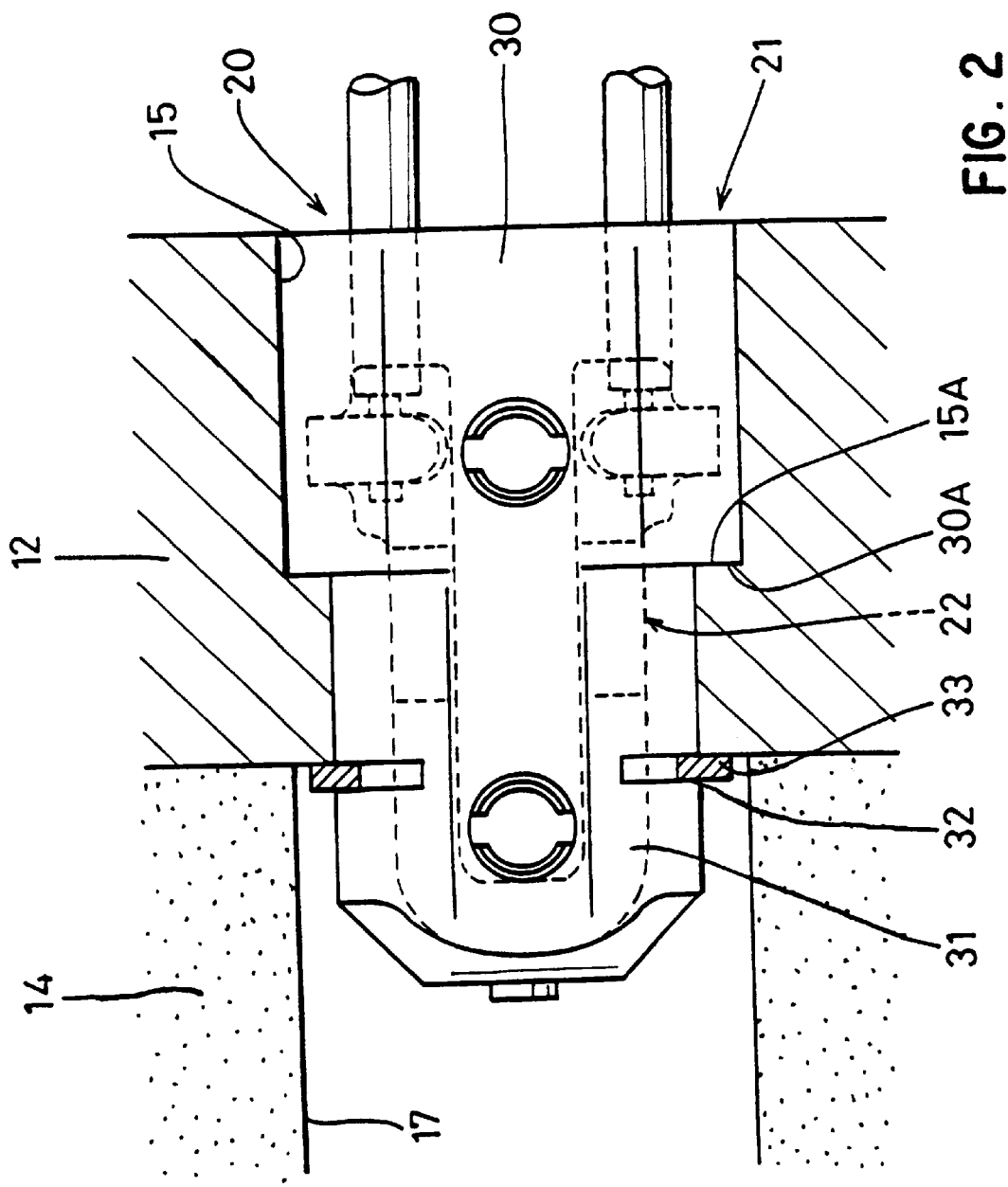
FIG. 2 is a side cross-sectional view of a backplate to which an abrasion detecting probe has been attached.

As shown in FIG. 2, an abrasion detecting probe 20 suitable for use in the present invention is attached by being inserted into a through hole 15 formed in a backplate 12, the anterior end of the probe 20 protruding into a through hole 17 formed in the brake pad friction material 14.

Figure 3:
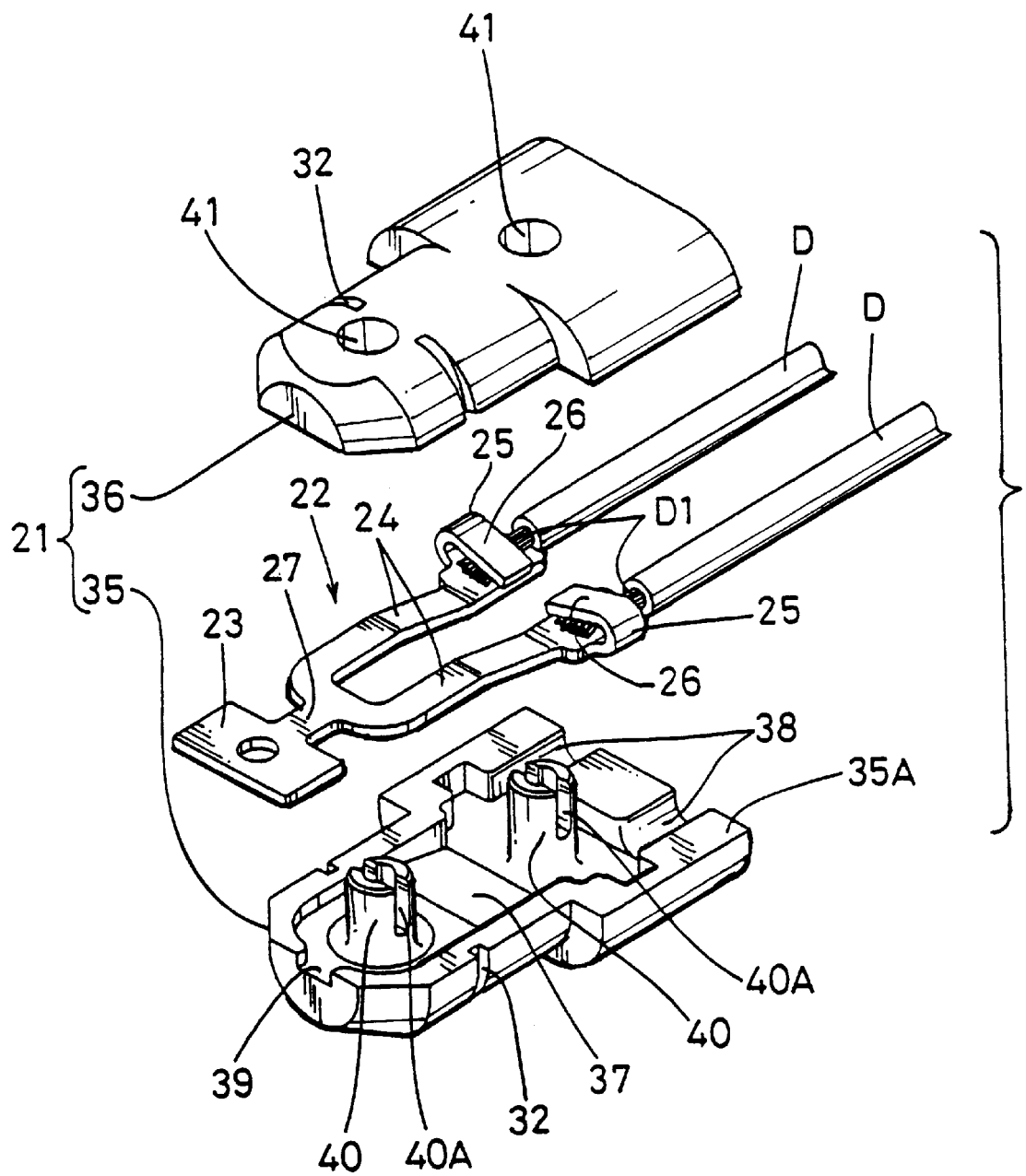
FIG. 3 is an exploded view of the abrasion detecting probe.

As shown in FIG. 3, the probe 20 is provided with a terminal 22 made of metal and located within a base member 21 of synthetic resin. The terminal 22 is provided with a pair of foot members 24, which form a U-shape, joined at the base by a carrier 23 which can be cut off short. The anterior end of each foot member 24 is provided with a crimping member 25 for crimping an electric wire D, each crimping member 25 comprising a protrusion 26 which extends out from the side of the foot member 24 and is folded back above the foot member 24. Core wires D1 of the electric wire D are held between the protrusion 26 and the foot member 24 and an electrical connection is established. The core wires D1 are welded to the terminal 22 in order to further strengthen the connection. Furthermore, the foot members 24 are cranked downwards (as viewed) so that the protrusions 26 of the crimping members 25 do not protrude greatly (upwards in FIG. 3) relative to the terminal 22.

Figure 6:
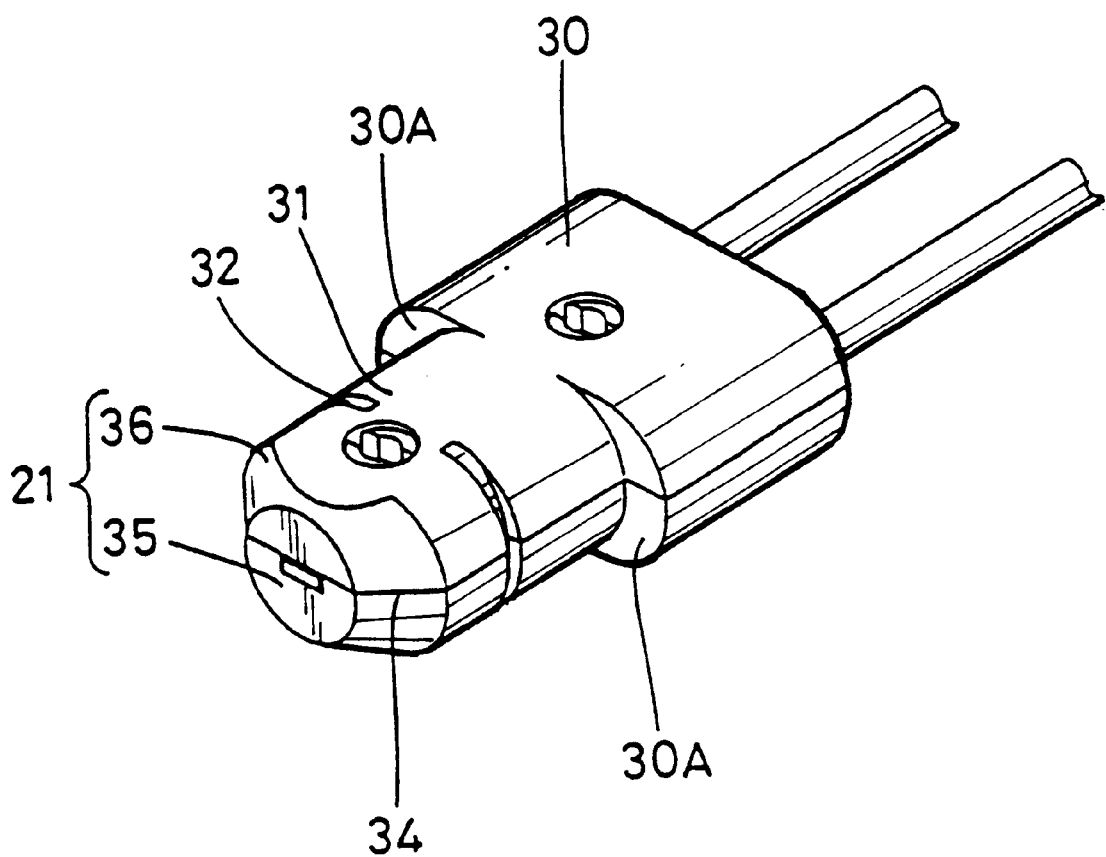
FIG. 6 is a diagonal view showing the abrasion detecting probe in a completed state.

The entire base member 21, shown in FIG. 6, has a column shape in the direction of a horizontal cross-sectional, and protrudes from the base 12. A posterior portion 30, posterior relative to the direction of insertion, having step-shaped protrusions on both sides. As shown in FIG. 2, stepped faces 30A of the posterior portion 30 make contact with stepped faces 15A formed in a through hole 15, thus determining the insertion position of the probe 20. Further, a groove 32 is formed on an anterior portion 31 of the base member 21 along the direction of the circumference of the outer circumference face. As shown in FIG. 2, after the probe 20 is inserted into the through hole 15 of the base 12, a clip 33 is installed in the groove 32, this clip 33 being abutting against the open edge of the through hole 15 on the base 12 and thereby retaining the probe 20 in position.

As shown in FIG. 3, the base member 21 is divided along in the horizontal direction into a first base component 35 (the lower part of the base member 21 in FIG. 3) and a second base component 36 (the upper part of the base member 21 in FIG. 3).

On the first base component 35, a housing 37 is formed into an attachment face 35A, this attachment face 35A joining with the second base component 36, and the housing 37 housing the terminal 22. The lower face of the housing 37 is inclined part-way along the face to correspond to the moderate crank-shape of the foot members 24, the side corresponding to the crimping members 25 being deeper. The anterior side (the lower left side in FIG. 3) of the circumference face of the housing 37 is of a round shape that corresponds to the U-shaped base of the terminal 22, and the posterior side (the upper right in FIG. 3) widens out on both sides in order to house the sideways-protruding portions of the crimping members 25. Further, a pair of rounded grooves 38 which pass through to the housing 37 are formed on the posterior end of the first base component 35, the electric wires D which are attached to the terminal 22 passing to the exterior of the base member 21 through these rounded grooves 38. In addition, an angular groove 39 which passes through to the housing 37 is formed on the anterior end of the first base component 35, a connecting member (or bridging portion) 27 which links the carrier 23 and the terminal 22 passing therethrough, the carrier 23 being provided externally with respect to the base member 21.

Figure 4:
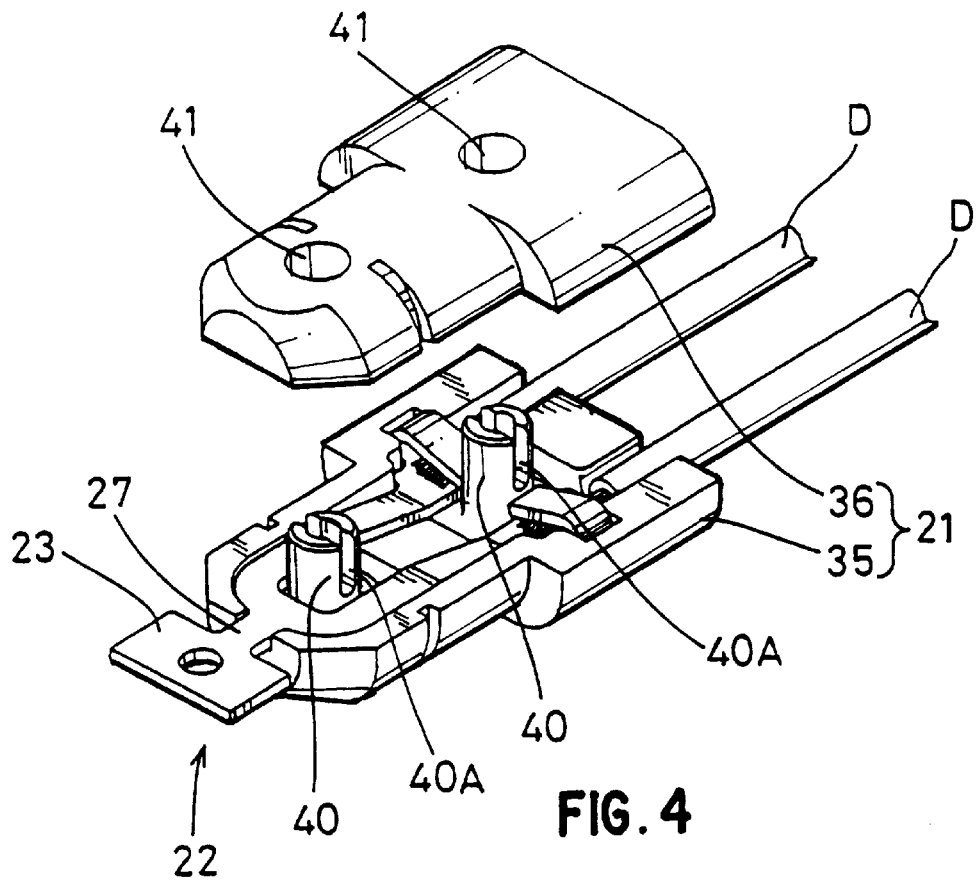
FIG. 4 is an exploded view showing a terminal housed within a housing of a base component.
Figure 5:
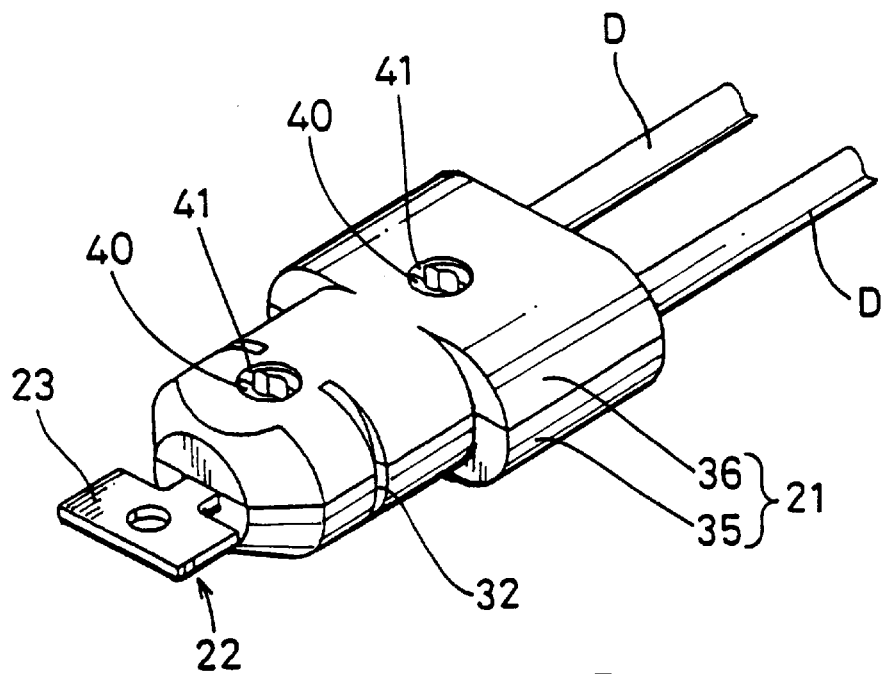
FIG. 5 is an exploded view showing the base components in an attached state.

A pair of position-fixing protrusions 40 are provided along a length-wise direction on the first base component 35. These position-fixing protrusions 40 protrude from the base face of the first base component 35 towards the second base component 36 and, as shown in FIG. 4, these position-fixing protrusions 40 are located respectively between the anterior end and the base end of the foot members 24 of the terminal 22. Further, a slit 40A is formed from the tip towards the base on each position-fixing protrusion 40.

Figure 7:
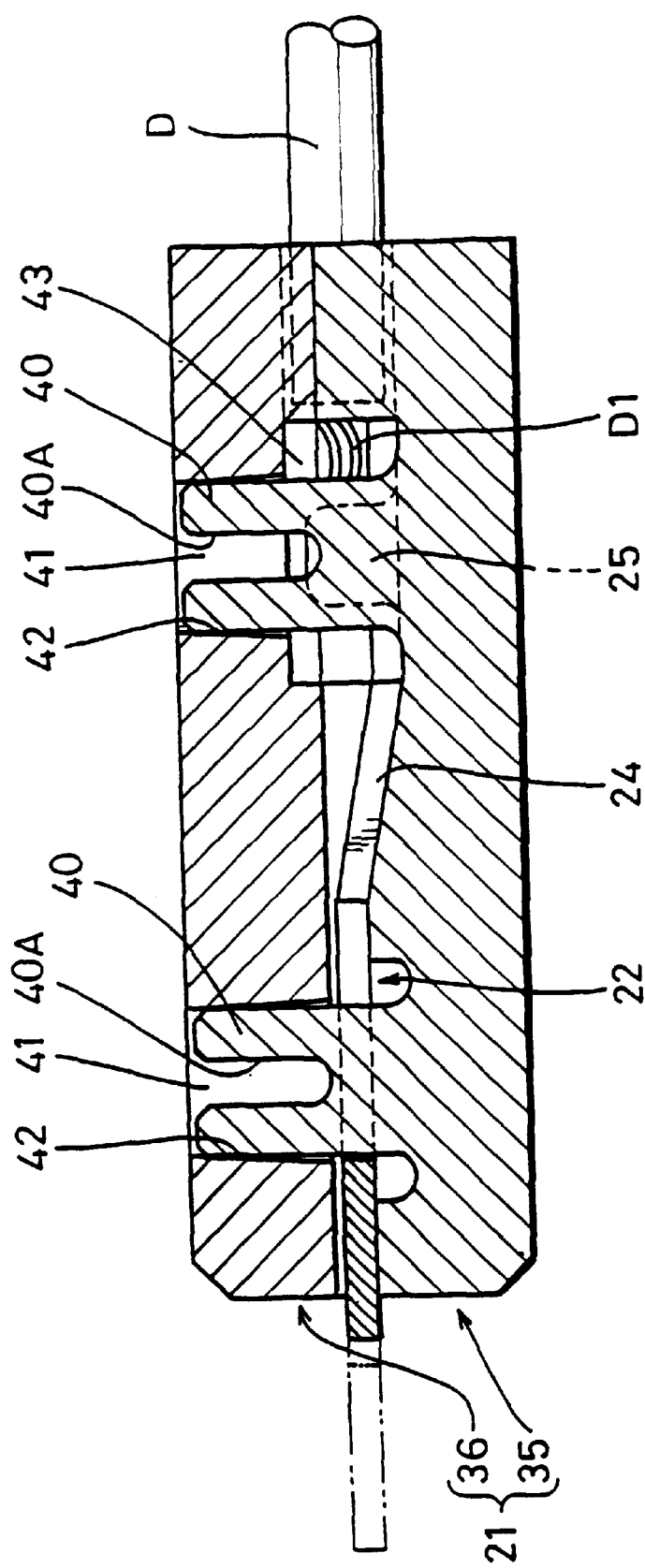
FIG. 7 is a cross-sectional view of the abrasion detecting probe in a completed state.

As shown in FIG. 7, a pair of position-fixing holes 41 pass through the second base component 36, the position-fixing protrusions 40 being inserted through these position-fixing holes 41, and this insertion fixing the base components 35 and 36 so that they do not move. The inner circumference of each position-fixing hole 41 has a tapered face 42, this tapered face 42 becoming narrower towards the farther side from the direction of insertion of the position-fixing protrusion 40. Consequently, the position-fixing protrusions 40 change shape and become narrower in the direction in which the slits 40A are narrower. As shown in the same figure, a housing 43 is formed on the attachment face of the second base component 36, this housing 43 housing the crimping members 25 protruding from the housing 37 of the first base component 35.

With the configuration as described above, the operation and effects of the present embodiment are explained.

The probe 20 is manufactured in the following manner. The terminal 22 inside the probe 20 is manufactured by a process of punching and folding metal plate. Then, the core wires D1 of the electric wire D are crimped between the foot members 24 and the protrusions 26 provided on the crimping members 25 of the terminal 22. Then, the core wires D1 are welded to the crimping members 25.

In the case of the conventional probe 1 (see FIG. 8), the terminal 22 is conveyed to the injection moulding site, and the terminal 22 must be set inside the mould and then insert-moulding carried out. As stated above, this is a troublesome and time-consuming operation which does not allow costs to be reduced.

However, the probe 20 of the present embodiment can be produced in the manner described below without having to perform insert-moulding. That is, the first and second base components 35 and 36 of the probe 20 are manufactured by injection moulding separately from the terminal 22, and are conveyed to the site in which they will be attached to the terminal 22. At that site, as shown in FIG. 4, the terminal 22 is housed within the housing 37 of the first base component 35, the attachment faces of the first and second base components 35 and 36 are set facing one another and are then joined together. Then, the position-fixing protrusions 40 enter the position-fixing holes 41, thus mutually fixing the position of the first and second base components 35 and 36 and attaching them so that they do not move (see FIG. 5). At this juncture, the tapered faces 42 provided in the position-fixing holes 41 (see FIG. 7) guide the position-fixing protrusions 40, so that the slits 40A in the tips of the position-fixing protrusions 40 change shape and become narrower and, as a result of the outward force exerted by the position-fixing protrusions 40, the circumferential faces of the position-fixing protrusions 40 and the position-fixing holes 41 fit closely together. This prevents the base components 35 and 36 from rattling. Further, the friction between the position-fixing protrusions 40 and the position-fixing holes 41 maintains the base components 35 and 36 in a joined state. Next, the carrier 23 (see FIG. 5) protruding anteriorly from the base member 21 of the terminal 22 is cut off, and the attachment of the probe 20 is complete (see FIG. 6).

In this manner, in the probe 20 of the present embodiment, the base components 35 and 36 are joined together in a simple operation which allows the terminal 22 to be attached within the base member 21. As a result, in comparison to the conventional example in which insert-moulding is required, the probe can be manufactured simply and cheaply.

The completed probe 20, as shown in FIG. 2, is inserted into the through hole 15 of the base 21 of the braking device, and the clip 33 is attached to the groove 32 of the probe 20 by means of a specified tool. The probe 20 is in a fixed state in the base 12 with its tip protruding into the brake pad 14. In this state, the base components 35 and 36 are maintained reliably in a joined state by the clip 33 and the inner wall of the through hole 15, and will not separate even if shaken, etc. When the brake pad 14 attains its abrasion limit as a result of sliding contact with the disc 10 (see FIG. 1), the tip 27 of the probe 20 is worn away together with the brake pad 14, the foot members 24 are separated, and the circuit between the two electric wires D is broken, thus allowing the attainment of the abrasion limit to be detected.

Figure 8:
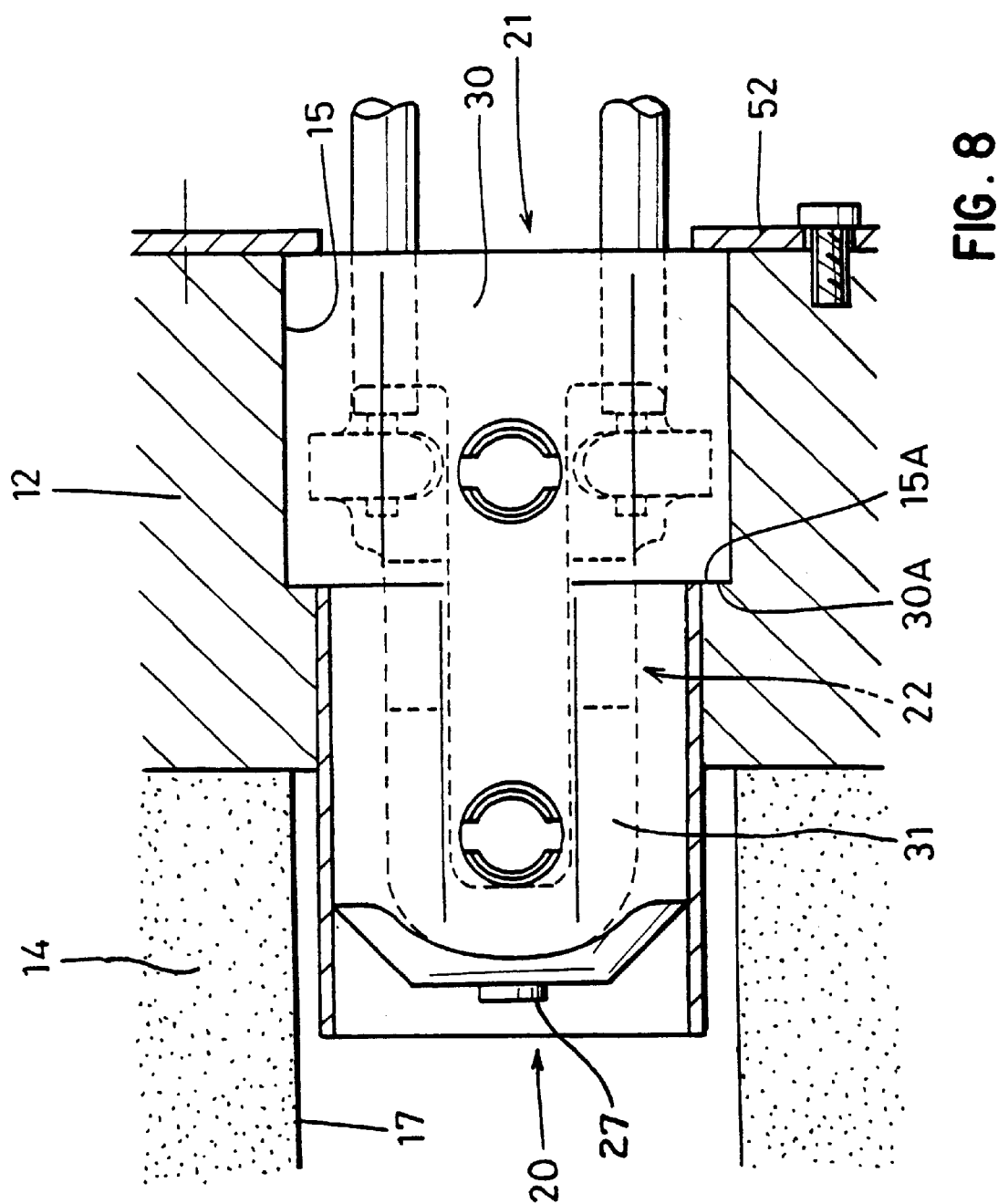
FIGS. 8–10 are similar to FIGS. 2, 3 and 6, and illustrates an outer sleeve for the probe according to a second embodiment of the invention.
Figure 9:
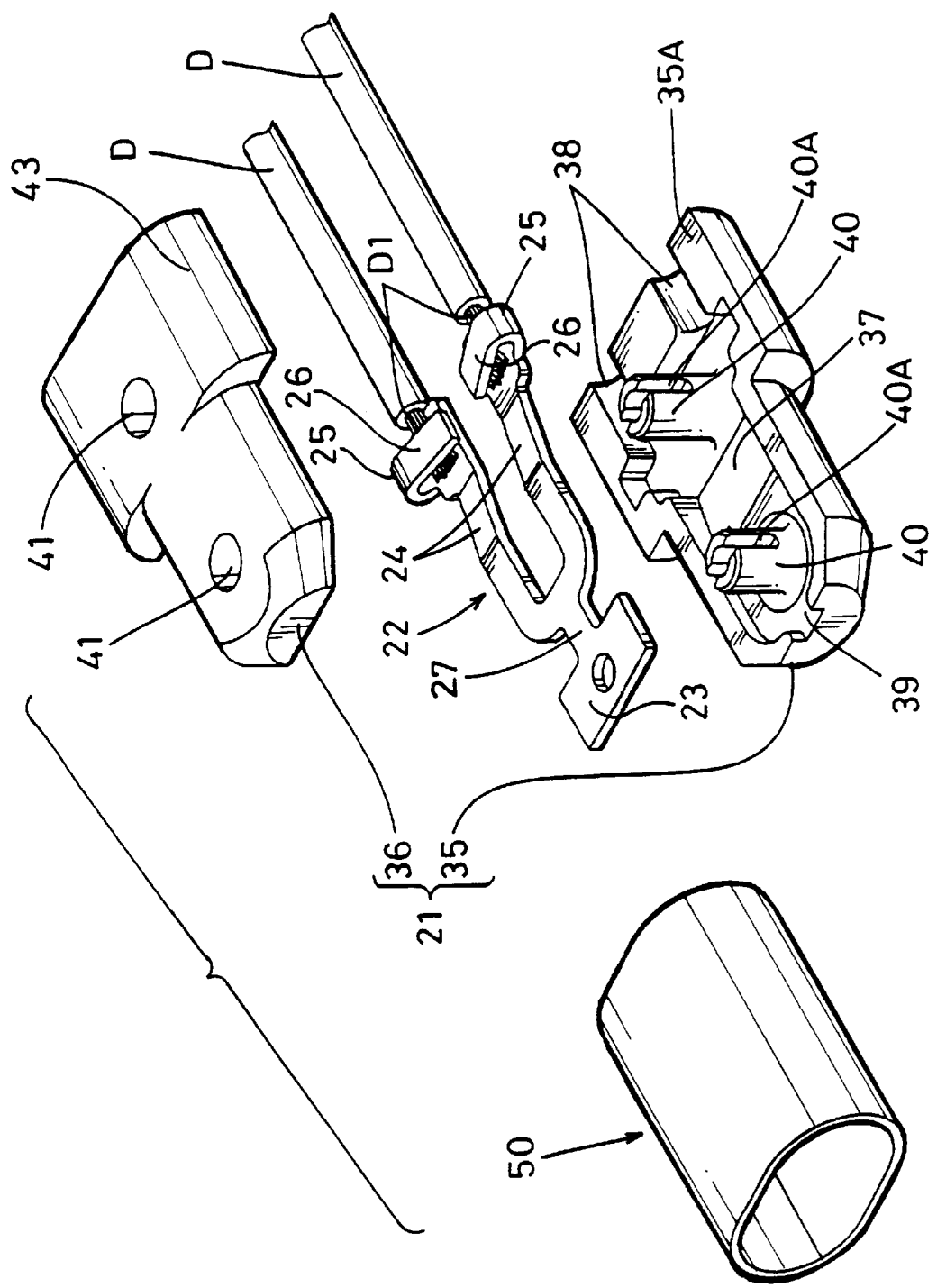
Figure 10:
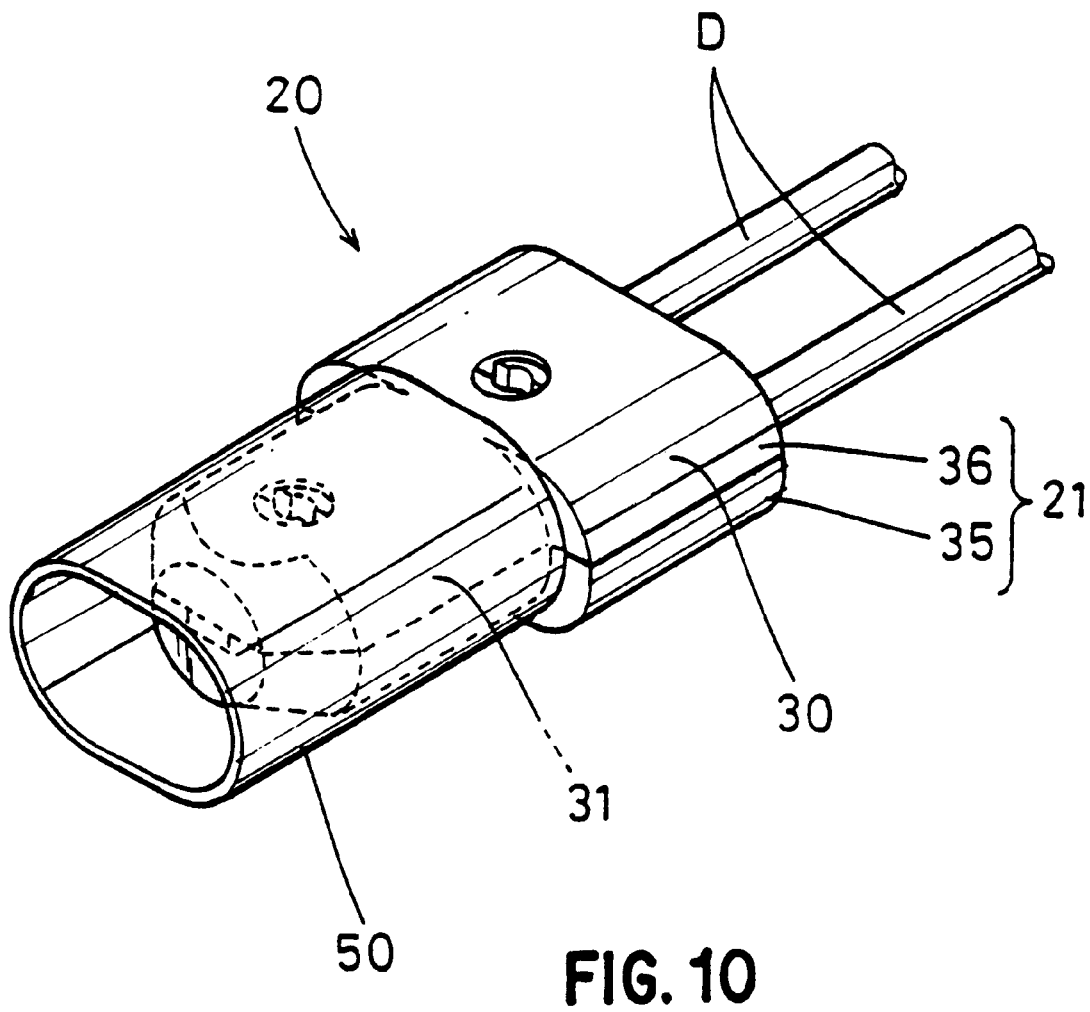
Figure 11:
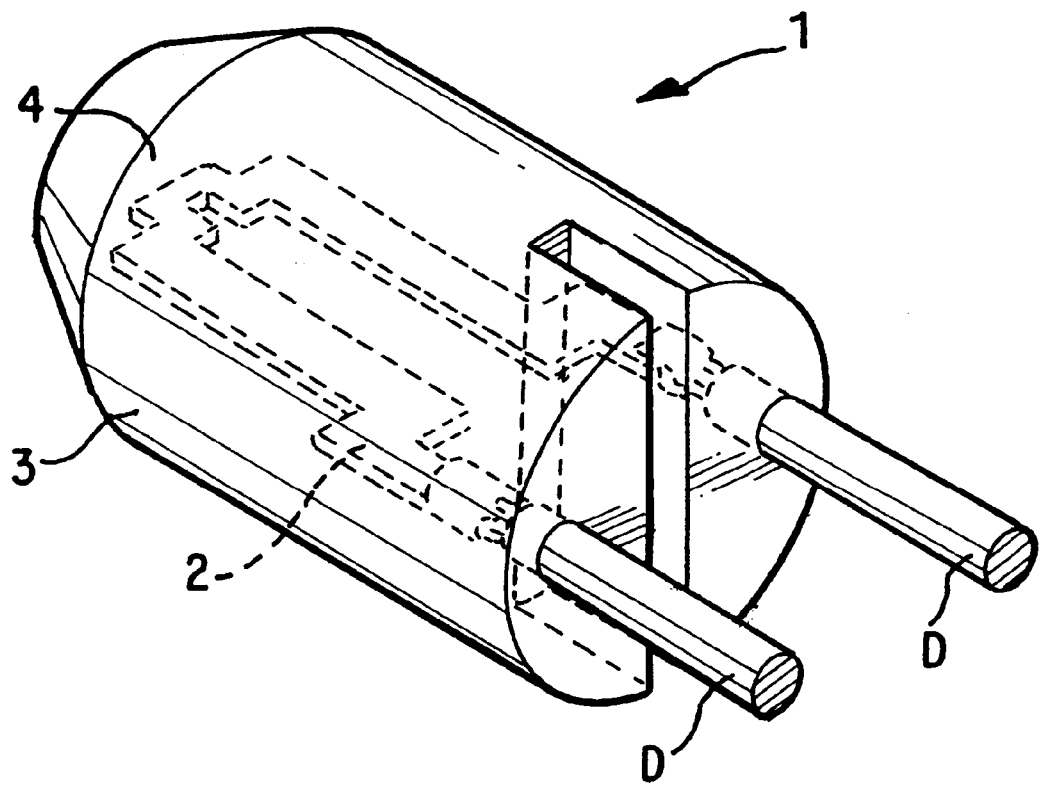
FIG. 11 is a diagonal view showing a prior art abrasion detecting probe.

A second embodiment of the invention is illustrated in FIGS. 8–10, the same parts having common reference numerals.

As illustrated a sleeve 50 surrounds the base components 35,36, and maintains them in an attached state. The sleeve 50 is a tight push fit over the components 35,36. As illustrated, the sleeve 50 projects slightly beyond the tip 27 of the terminal 22, so that as the pad approaches the abrasion limit, the sleeve 50 rubs against the disc. A bracket 52 holds the probe in the brake pad. The sleeve is made of a material, such as metal, which will make a noise as it is worn away; in this way the driver can hear an audible signal that the abrasion limit is about to be reached.

The sleeve 50 also has the advantage of preventing separation of the components 35,36 during transport from a connector manufacturing location to a brake pad installation location. Furthermore, if the brake pad is replaced when the audible warning is first heard, there is no need to replace the probe itself—the probe can simply be inserted into a replacement brake pad without any disconnection of the electrical wires. If however the tip 27 is worn away, the electrical circuit is broken, thus enabling a signal, such as a warning light, to be indicated to the driver.

The present invention is not limited to the embodiments described above with the aid of figures. For example, the possibilities described below also lie within the technical range of the present invention. In addition, the present invention may be embodied in various other ways without deviating from the scope thereof.

(1) In the present embodiment, the base member 21 can be divided into two base components 35 and 36. However, the number of base components into which the base member 21 can be divided is not limited to two.

(2) In the present embodiment, tapered faces 42 are formed on the inner circumference of the position-fixing holes 41. However, it may equally well be the case that tapered faces are formed on the outer circumference of the position-fixing protrusions 40.

(3) The sleeve (50) may be used to hold the base components 35,36 together in the absence of an integral latch.

What is claimed is:

1. A wear detecting probe for a vehicle brake lining having a backplate and a friction lining thereon, said probe comprising an electrically conducting member adapted for connection to an electrical circuit by input and output connections, said conducting member being housed inside an insulating body and extending generally in a plane parallel to the longitudinal axis of the probe, and having a bridging portion adjacent one end of said body such that, in use, a braking surface wears away said bridging portion to separate said conducting member into two parts and thereby breaks an electrical circuit, wherein said body comprises two mutually attachable components defining a cavity to house said conducting member, and said components are separable generally along said plane such that the components cover opposite sides of the conductor housed in the body.

2. A probe according to claim 1 wherein said components are moulded in plastics material, and have mutually engageable snap-fitting latch means.

3. A probe according to claim 2 wherein said latch means comprise an upstanding post of one component and an aperture of another component.

4. A probe according to claim 3 wherein said conducting member is 'U' shaped, and said post passes through the limbs of said conducting member.

5. A probe according to claim 4 wherein said bridging portion is at the base of said conducting member, and in the plane thereof.

6. A probe according to claim 3 wherein said latch means comprise two posts engageable in respective apertures, said posts being aligned with the direction of fitting of said probe.

7. A probe according to claim 4 wherein said latch means comprise two posts engageable in respective apertures, said posts being aligned with the direction of fitting of said probe.

8. A probe according to claim 5 wherein said latch means comprise two posts engageable in respective apertures, said posts being aligned with the direction of fitting of said probe.

9. A probe according to claim 1 wherein said body comprises a shoulder for engagement with said friction lining, and adapted to limit the insertion depth of said probe in said lining.

10. A probe according to claim 9 wherein said body includes a circumferential groove about the fitting axis thereof, said groove being adapted to receive a circlip engageable with the friction lining side of a backplate, said circlip preventing removal of said probe in use.

11. A probe according to claim 1 wherein said body further includes a sleeve around the exterior thereof, said sleeve protruding further than said bridging portion.

12. A probe according to claim 11 wherein said sleeve is adapted to generate sound when in contact with a brake rotor.

* * * * *